(12) United States Patent
Potgieter et al.

(10) Patent No.: US 9,279,090 B2
(45) Date of Patent: Mar. 8, 2016

(54) METHOD FOR CLEANING PRODUCER GAS USING A MICROWAVE INDUCED PLASMA CLEANING DEVICE

(71) Applicant: PHG Energy, LLC, Nashville, TN (US)

(72) Inventors: Deon John Potgieter, Brentwood, TN (US); Mark Oliver Loftin, Mobile, AL (US); Tom Stanzione, Knoxville, TN (US); Jeffrey Scott Brown, Leland, MS (US)

(73) Assignee: PHG ENERGY, LLC, Antioch, TN (US)

( * ) Notice: Subject to any disclaimer, the term of this patent is extended or adjusted under 35 U.S.C. 154(b) by 0 days.

(21) Appl. No.: 14/842,494

(22) Filed: Sep. 1, 2015

(65) Prior Publication Data

US 2015/0368573 A1  Dec. 24, 2015

Related U.S. Application Data

(62) Division of application No. 14/517,629, filed on Oct. 17, 2014, now Pat. No. 9,150,806.

(60) Provisional application No. 62/006,448, filed on Jun. 2, 2014.

(51) Int. Cl.
*H05F 3/00* (2006.01)
*C10K 3/00* (2006.01)
*C10K 1/20* (2006.01)

(52) U.S. Cl.
CPC .. *C10K 3/008* (2013.01); *C10K 1/20* (2013.01)

(58) Field of Classification Search
CPC .......... C10K 3/008; C10K 1/20; C10K 3/023; B01J 19/245; B01J 2219/00306; B01J 2219/00495; B01J 2219/185; B01J 2219/24; B01D 53/007; B01D 53/04; B01D 2253/102; B01D 2259/806; B01D 2255/40; H05H 1/30; H05H 1/0062
See application file for complete search history.

(56) References Cited

U.S. PATENT DOCUMENTS

| | | | |
|---|---|---|---|
| 2003/0101938 A1* | 6/2003 | Ronsse et al. | 118/726 |
| 2010/0143209 A1* | 6/2010 | Cha | 422/171 |
| 2010/0219062 A1* | 9/2010 | Leon Sanchez | 204/157.43 |
| 2010/0252550 A1* | 10/2010 | Dunn | 219/700 |

* cited by examiner

*Primary Examiner* — Xiuyu Tai
(74) *Attorney, Agent, or Firm* — Kelly J. Hollowell; Stites & Harbison PLLC

(57) ABSTRACT

A device and method for cleaning producer gas includes a filter bed chamber, a microwave chamber, a first catalytic chamber and a second catalytic chamber. The filter bed chamber comprises an inlet for carbon-based material and a spent carbon outlet. The microwave chamber comprises a permeable top and wave guides around the perimeter through which microwaves can be introduced into the device using magnetrons. The first catalytic chamber is connected to the microwave chamber, and the second catalytic chamber is connected to the first catalytic chamber. The method comprises using the device by filling the filter bed chamber with carbon-based material, introducing microwaves into the microwave chamber using the magnetrons and wave guides, dissociating heavy carbons entrained within the gas by passing the gas through carbon-based material in the filter bed chamber, the microwave chamber, the first catalytic chamber and the second catalytic chamber.

13 Claims, 4 Drawing Sheets

US 9,279,090 B2

METHOD FOR CLEANING PRODUCER GAS USING A MICROWAVE INDUCED PLASMA CLEANING DEVICE

RELATED APPLICATION

This application is a divisional application of U.S. patent application Ser. No. 14/517,629, filed Oct. 17, 2014, and it claims priority from U.S. Provisional Patent Application No. 62/006,448, filed Jun. 2, 2014, the contents of which are both incorporated herein by reference.

BACKGROUND OF THE INVENTION

Gasification is a continuous thermal decomposition process in which solid organic or carbonaceous materials (feedstock) break down into a combustible gas mixture. The combustible gas components formed are primarily carbon monoxide (CO), hydrogen (H2), and methane (CH4). Other non-combustible gases such as nitrogen (N2), steam (H2O), and carbon dioxide (CO2) are also present in various quantities. The process of gasification involves pyrolysis followed by partial oxidation, which is controlled by injecting air or other oxygen containing gases into the partially pyrolysed feedstock. More specifically, biomass gasification is a sequence of reactions including water evaporation, lignin decomposition, cellulosic deflagration and carbon reduction. If concentrated oxygen is used, the resulting gas mixture is called syngas. If air (which includes nitrogen) is used as the oxidant, the resulting gas mixture is called producer gas. For simplicity, the term "producer gas" as used herein shall include both syngas and producer gas. Both gas mixtures are considered a "fuel gas" and can be used as a replacement for natural gas in many processes. They can also be used as a precursor to generate various industrial chemicals and motor fuels. When biomass is used as the feedstock, gasification and combustion of the producer gas is considered to be a source of renewable energy.

Producer gas may be burned directly in some engines and burners, purified to produce methanol and hydrogen, or converted via the Fischer-Tropsch and other methods and processes into synthetic liquid fuel.

Charcoal has been used to clean liquids and gases since as early as 2000-1500 B.C. As gas passes through activated carbon, the carbon absorbs many of the impurities as well as CO and CO2.

Microwaves have been used to heat substrates since the 1950s, with adoption of microwaves to catalyze chemical reactions beginning in the 1980s. Microwaves have the ability to heat a substrate without heating the surrounding vessel and also the ability to heat the inside of a substrate rather than simply heating the outside of it. Microwaves can also heat a substrate faster than traditional heating methods. Finally, it typically requires less energy to heat a substrate using a microwave than through conduction or convection.

Many devices and techniques have been used to purify, clean and prepare fuel gases, particularly syngas created as a result of gasification of biomass in the presence of concentrated oxygen and producer gas created as a result of gasification of biomass in the presence of air (which includes Nitrogen). In order for syngas or producer gas to be useful as a fuel gas, the tar and other contaminants must be removed from the gas.

Current devices and methods typically rely on partially combusting the unprocessed gas in order to generate the energy required to break down tars. These devices and methods waste the gas and may introduce additional contaminants as a result of incomplete combustion of tars.

What is needed is an efficient, low cost device and method to remove tars and other contaminants from unprocessed syngas and producer gas in order to prepare fuel gas. The device and method should not rely on combusting the gas as an energy source, but should rely on a lower cost energy source to complete the purification.

SUMMARY OF INVENTION

Disclosed is a device and method for cleaning producer gas using microwaves, activated carbon and proprietary microwave absorbers that produce heat for thermal cracking of tars and long chain hydrocarbons to yield higher ratios of pure gas than are currently attained using traditional techniques. When microwaves are focused on a chamber of such unprocessed gas, the gas heats, and the carbon microwave interaction ionizes to a plasma, the combination of processes causes impurities and heavy carbons to dissociate within the gas stream. By passing the gas through a bed of activated carbon (for example, biochar recovered from a downdraft gasifier) or lignite before it is microwaved, many of the impurities can be physically captured by the activated carbon and separated from the gas. The combination of carbon filtration and plasma ionization cleans the gas and yields a higher ratio of clean pure gas for applications requiring that quality.

These and other advantages of the invention will be further understood and appreciated by those skilled in the art by reference to the following written specifications, claims and appended drawings.

DETAILED DESCRIPTION

It is to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise. The gas cleaning device and it features are listed here, and more details of embodiment options are discussed below.

I. Device Overview

The device 100 is a standalone gas cleaning unit that accepts an unprocessed stream of gas, filters the gas through a bed of activated carbon and then ionizes the gas stream as well as exposing it to high temperatures by directing microwaves into it. The purified or processed gas is siphoned off so that it may be cooled and used in industrial and commercial applications.

Figure 1:
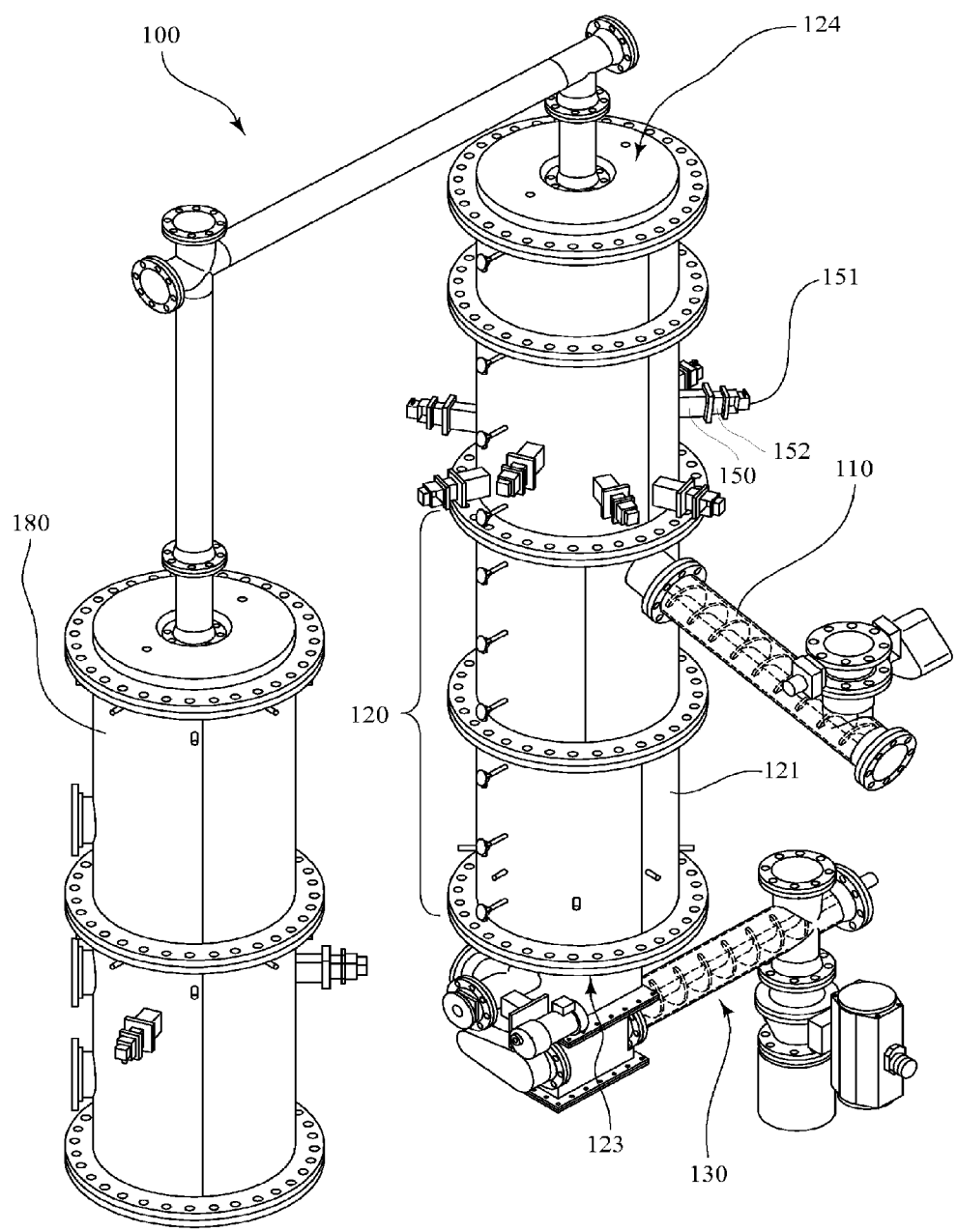
FIG. 1 is a perspective view of the device.
Figure 2:
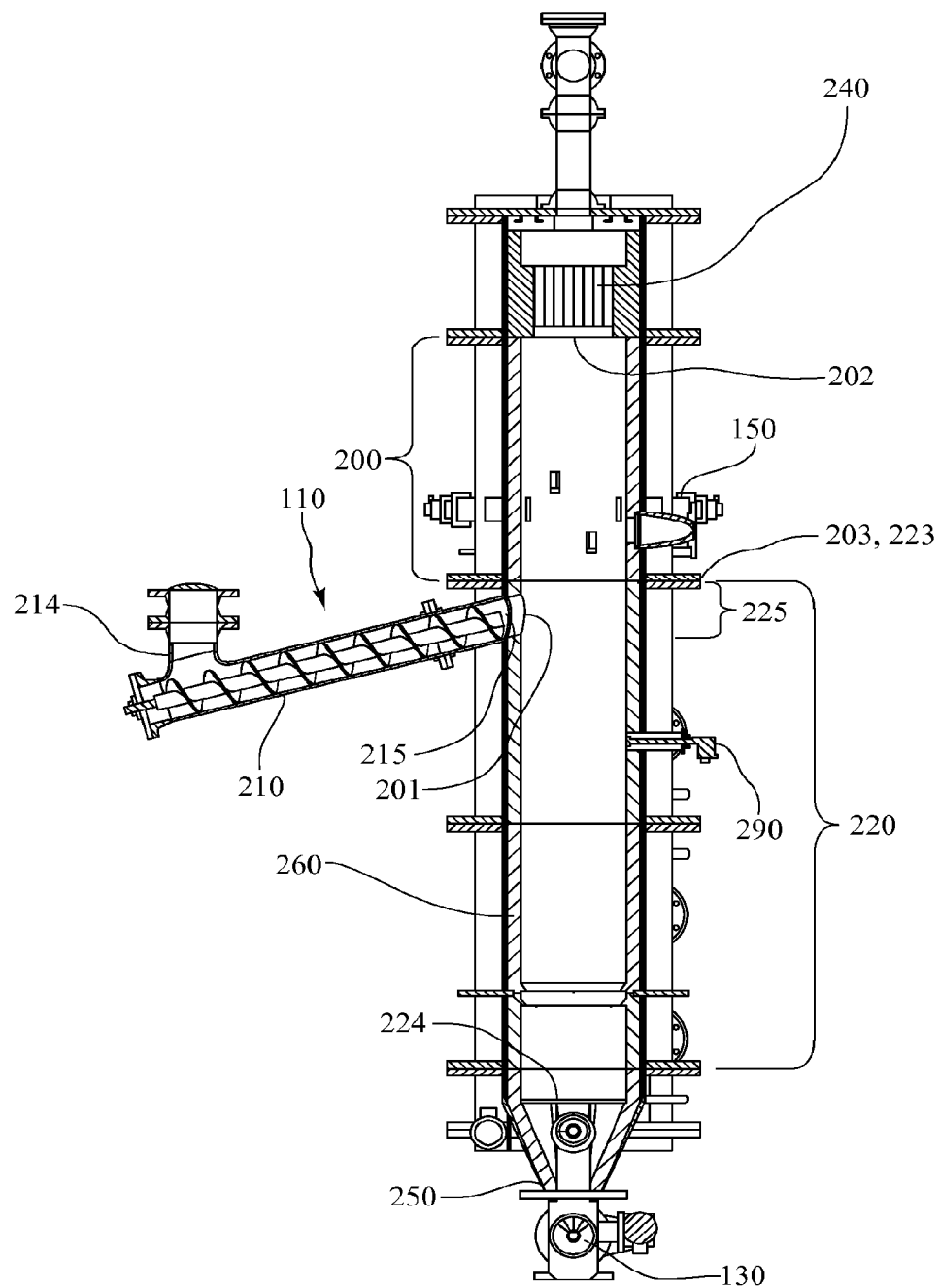
FIG. 2 is a side cutaway view of the device, including a feed auger assembly.
Figure 3:
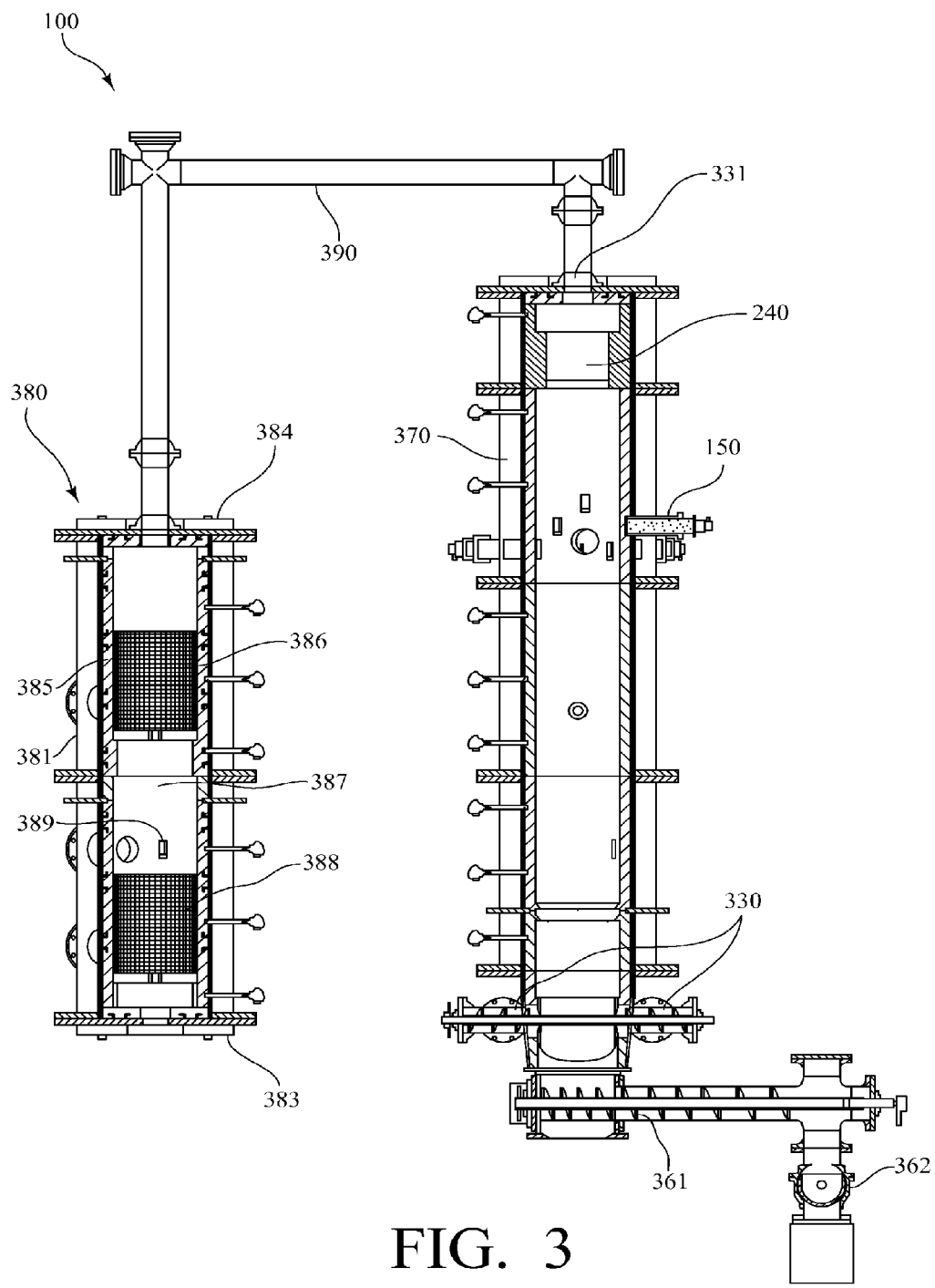
FIG. 3 is a side cutaway view of the device, including a residue extraction auger.

As shown in FIGS. 1, 2, and 3, the device 100 can be configured in many ways. In one embodiment, the device comprises the following components: a feed auger assembly 110; a filter bed housing 120; a microwave chamber 200; at least one gas inlet 330; a residue extraction auger assembly 130; and at least one catalytic chamber. As shown in FIG. 1, the device can be constructed as a first vertically positioned tube, the tube having a perimeter, an external wall 121 and a proximal end 124 and a distal end 123. As shown in FIG. 2, the device has an interior wall 122 and a first catalytic chamber 240. As shown in FIG. 3, a second catalytic chamber 380 comprises a second vertically positioned tube, the second tube also having a perimeter, an external wall 381, a proximal end 384 and a distal end 383. As shown in FIG. 3, the second catalytic chamber 380 can also have an interior wall 385.

As shown in FIG. 1, the first vertically positioned tube can be constructed with several shorter vertically positioned tubes of the same diameter bolted together. In one embodiment, each vertically positioned tube is between about 48 inches long and 60 inches long, for a total combined tube length of about 228 inches. In one embodiment, the first vertically positioned tube is made from A36 steel plates. In one embodiment, the diameter between opposing interior walls of the first vertically positioned tube is approximately 26 inches.

As shown in FIG. 2, in one embodiment, the device 100 is housed in a first vertically positioned tube having a perimeter, an interior wall, an exterior wall 121, a proximal end 124 and a distal end 123. In one embodiment, the housing contains a filter bed chamber 220 at the proximal end 124; an inlet 201 for carbon-based material and a spent carbon outlet 250; a gas inlet 330 located between the spent carbon outlet 250 and the filter bed chamber 220. The housing contains a microwave chamber 200 located above the filter bed chamber 220. The microwave chamber 200 has a permeable top 202 comprising a microwave absorbing material, wave guides 150 located around the perimeter through which microwaves can be introduced into the device 100, and a magnetron and an isolator attached to each wave guide 150. The device 100 can have a first catalytic chamber 240 connected and distal to the microwave chamber 200; a gas outlet 331 connected to the first catalytic chamber 240; and, in one embodiment, a second catalytic chamber 380 connected to the gas outlet 331 of the first catalytic chamber 240. The second catalytic chamber 380 can be a second vertically positioned tube having a perimeter, an interior wall 385, an exterior wall 381, a proximal end 383 and a distal end 384.

The method of cleaning gas involves using the device described in the previous paragraph by performing the following steps: filling the filter bed chamber 220 up to the top of the filter bed chamber 220 with carbon-based material; introducing microwaves into the microwave chamber 200 using the magnetrons and wave guides 150; dissociating heavy carbons entrained within the gas by passing gas through the gas inlet 330, the carbon-based material in the filter bed chamber 220, the microwave chamber 200, the first catalytic chamber 240 and the second catalytic chamber 380; and then siphoning the purified gas.

II. Microwave Chamber Assembly

A. Feed Auger Assembly

In one embodiment, the biochar (also called activated carbon) can be the by-product of downdraft gasification, coal or any other carbon-based material suitable for filtration. As shown in FIG. 2, the activated carbon enters the device 100 through an auger chute 210, the auger chute 210 has an inlet 214 and an outlet 215. The device 100 has a filter bed chamber inlet 201 for activated carbon to enter a filter bed chamber 220. In one embodiment, the auger chute 210 feeds carbon-based material, such as, for example, biochar into the top of the filter bed chamber 220, adding to the bed of carbon-based material within the chamber. The feed auger assembly 110 can extend all or part of the way to the filter bed chamber inlet 201. Microwaves can be prevented from back-flowing through the auger chute 210 by the carbon-based material itself, which interacts with the microwaves at the outlet of the auger chute 210 or by a guide if the guide extends into the microwave chamber 200.

B. Filter Bed Chamber

In one embodiment, the biochar can fill the device 100 up to the microwave chamber 200. In this embodiment, the biochar bed forms the bottom of the microwave chamber 200. In operation, the leading edge of the biochar is an interface that acts as a catalyst during operation of the device for creation of a plasma field due to the interaction of the microwaves with the biochar.

The device's 100 control systems determine when to initiate each biochar fill cycle based on the signals, such as temperature or pressure changes, received from various sensors and indicators on the device 100. The biochar level can be maintained by a radio-wave proximity switch. The end user may also automate the gasifier feedstock filling process with a timer or by using a microwave sensor or another suitable fill level indicator to detect the presence of feedstock at the fill level in the gasifier. The device 100 may have one or more fill level indicators capable of functioning in high temperature environments. The fill level indicator can be any indicator that will not interfere with or suffer from interference from the microwaves in the device 100. In one embodiment, once the fill level indicator detects that the biochar level is low, feed auger assembly 110 begins to feed biochar into the filter bed chamber inlet 201. One device design with multiple fill level indicators allows more options in choosing the height of the biochar residue bed when using an automatic filling system. The feed auger assembly 110 can be pressurized to match the pressure of the filter bed chamber 220. In one embodiment, the activated carbon is fed into the filter bed chamber 220 through the filter bed chamber inlet 201, the filter bed chamber inlet 201 being located in the upper half of the filter bed chamber 220.

C. Microwave Chamber

The microwave chamber 200 can be optimized in shape and materials used to generate the heat required for purification of the unprocessed gas. As shown in FIG. 2, the geometry of the microwave chamber 200 can be a cylindrical tube having walls and a top 202 and a bottom 203. The bottom 203 of the microwave chamber 200 can connect to another tube that is a filter bed chamber 220, also having a top 223 and a bottom 224. In one embodiment, the microwave chamber 200 and the filter bed chamber 220 are a single tube. In another embodiment, the tube is a non-cylindrical tube such as a square or a rectangle.

Above the bed of biochar there is a microwave chamber 200, the size of which microwave chamber 200 can vary. The microwave chamber 200 can be a tube or a conical shaped chamber. The microwave chamber 200 is designed to concentrate microwave fields created by electronically controlled microwave guns (also called magnetrons) located around the perimeter of the outside microwave chamber 200. The walls of the microwave chamber 200 are designed so that microwaves penetrate the walls at particular locations. The microwave chamber 200 can have holes or indentations to accommodate microwaves to pass through the walls. The design of the microwave chamber 200 allows the concentration of the microwaves to occur with discharges occurring between particles of biochar. The concentrated effect of these discharges will form a plasma region causing temperatures within the plasma regions to reach just under a theoretical temperature of 5,000 degrees F. In one embodiment, the top 202 of the microwave chamber 200 is made up of a specially designed lining such as silica carbide and aluminum oxide a carbon and aluminum oxide mixture. In one embodiment, the interior of the entire device 100 is lined with silica carbide, silica oxide, aluminum oxide, refractory alloys, other ceramics or another material having similar properties that is stable at high temperatures. In one embodiment, certain areas of the microwave chamber 200 are lined with a microwave absorbing material 260 that will produce high temperature zones to further enhance the thermal cracking process. The combination of materials used throughout the microwave chamber 200 also prevents microwaves from escaping the device 100. The microwave absorbing material can be any material that effectively converts microwave energy into heat energy. These materials can be, for example, without limitation, silica carbide mixes (concentrations of between 2.5% and as high as 12% suspended in any standard high temperature ceramic slurry).

The cellular wall structures of biochar or lignite have the geometries that are necessary for a discharge. The device 100 creates and sustains a plasmoid in a confined environment, the "e-field" density at the top of the bed of biochar promotes a plasma discharge. The top of the bed of biochar is at or near the top 223 of the filter bed chamber 220. The plasma discharge is a manifestation of the densified e-field interacting with the biochar. The continued supply of the microwaves and replacement of the biochar sustains the discharge within the environment. The biochar has sharp points along its surface, which promote the creation of a discharge. The interaction between the electromagnetic wave and these points causes the plasma discharge. Unlike other materials, the geometry of biochar promotes discharges at fairly low power levels. The range of power levels required for a discharge from biochar is lower than what is required for materials such as biomass.

Figure 4:
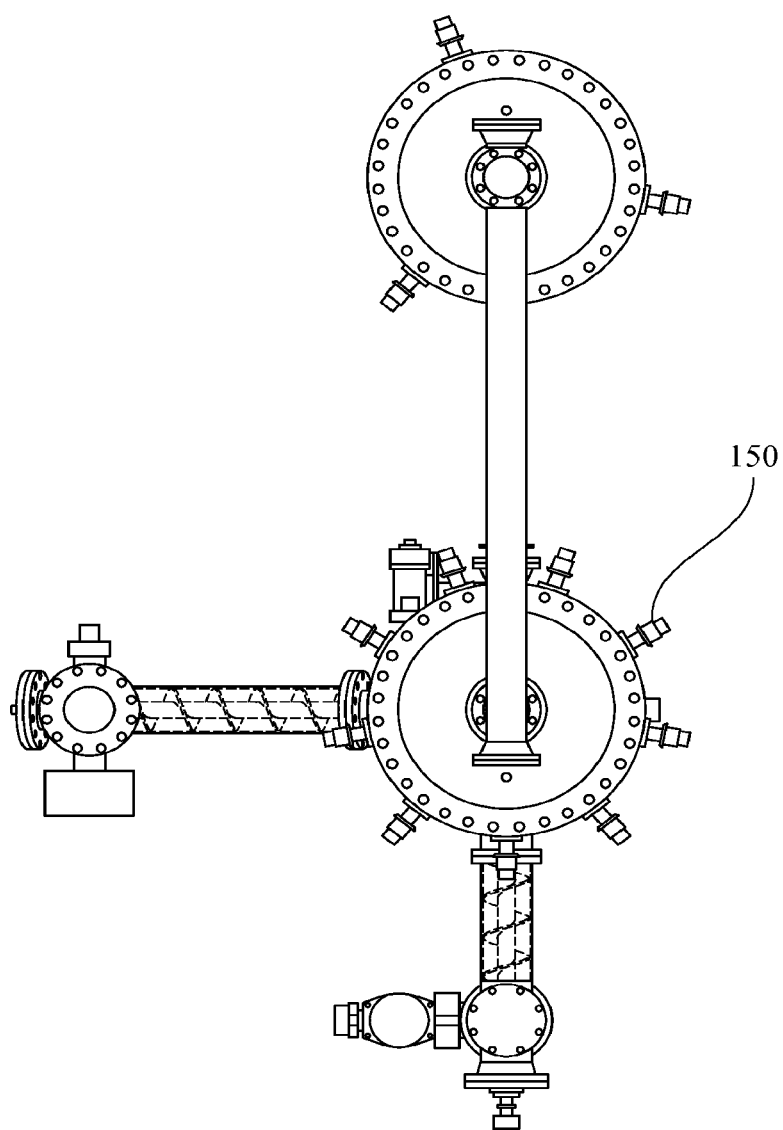
FIG. 4 is a top view of the device.

As shown in FIGS. 1 and 4, in one embodiment, microwaves can be introduced into the microwave chamber 200 using magnetrons 151 through approximately seven wave guides 150 located at holes or indentations around the circumference (or perimeter) of the microwave chamber 200. Each wave guide 150 is non-opposed relative to the others and can be positioned on different vertical planes so that no wave guide outlet points to any other wave guide 150. In one embodiment, the power of each magnetron 151 can be between 1.5 kW and 5 kW. The wave guides can be standard 1.7 inch×3.4 inch wave guides with a WR340 flange. The magnetrons 151 can be fired by programmable logic controlled power supplies. They can all fire at 2.45 GHz (standard class D emitters). The wave guides 150 can be straight and capped. The microwaves can pass through the caps, which caps can be made of ceramic material. The wave guides 150 can also use tuners. The tuners can also be omitted if the emitters used in an embodiment inherently reduce back-scatter. However, an isolator can be attached in some embodiments to protect the magnetron 151 and increase the equipment life (prevent overheating from reflected microwaves). For example, in one embodiment, there is an isolator 152 between the magnetron 151 and the wave guide 150. The wave guides 150 can guide a specific wave frequency, which frequency is dictated by the magnetron manufacturer. The frequency can change according to the embodiment of the device. The wave guides 150 guide the microwaves to the microwave chamber 200. The power settings can be set by cycling the magnetron power supplies. These can be an inverter type/style power supply. The microwave frequency can be different on some embodiments based on the magnetron selected. In one embodiment, the device is designed to get as much microwave energy into the plasma area (bottom of the microwave chamber) as possible at a reasonable cost. This cost factor not only relates to the efficiency of the magnetron but also the initial cost for the hardware. Lower frequency microwaves penetrate the residue bed better while higher frequencies will skim the surface and increase the specific temperature of the contact area more effectively. Either range of frequencies can be effective.

The heat from the microwaves in the microwave chamber 200 at the e-field causes the biochar to partially oxidize and smolder in the filter bed chamber 220. The biochar generates heat which otherwise would have had to be created.

The device 100 is designed to spread the discharges across the entire area of the microwave chamber 200 by containing the microwaves into a controlled zone, and using barriers to contain them. The design of the microwave chamber 200 (such as its geometry) also optimizes the interaction of the incoming gas, incoming microwaves, incoming substrate, exiting gas, and exiting substrate to optimize the interactions between the e-field, gas, and biochar. The microwave chamber 200 has a ceiling or top, and the ceiling or top can be lined with tiles. The tiles can contain a catalyst impregnated ceramic that converts microwave energy into heat energy. This ceramic barrier is primarily for microwave containment but also serves as a final "zone" (catalytic chamber shown in FIG. 2 as 240) at which tars can be broken down (by a standard thermal mechanism) as gas passes out of the microwave chamber 200 into a catalyst chamber.

D. Gas Inlet Ports

As shown in FIGS. 2 and 3, in one embodiment, the device 100 comprises gas inlet ports 330 for gas to enter and a microwave chamber inlet 201 for activated carbon to enter the microwave chamber 200. In one embodiment, the gas is introduced through flanged nozzles $\frac{1}{3}^{rd}$ way up from the bottom of device 100. In another embodiment, the gas is introduced through inlet ports 330 at the bottom of the filter bed housing 120. Each inlet 330 can be equipped with di-opposed twin nozzles and a deflecting diffuser above each nozzle entry point.

E. Residue Extraction Auger Assembly

The microwave chamber 200 or, in one embodiment, the filter bed chamber 220 further comprises an outlet 250 for spent carbon to exit the microwave chamber 200. The outlet 250 can be attached to a residue extraction assembly 130, having a residue extraction auger 361 and valve assembly 362. In one embodiment, the residue extraction assembly is an auger and pocket valve.

The residue extraction auger 361 may be made of steel, stainless steel or another strong, thermally stable, non-porous material. Biochar exits the device 100 by way of the residue extraction auger 361. The residue extraction auger 361 can be arranged at or near the bottom of the device 100. In one embodiment, at least two residue extraction augers 361 are symmetrically arranged with respect to center axis of the device 100.

The residue extraction auger 361 can be a tube-style auger. The residue extraction auger 361 can move the biochar into a pocket valve 362 that is bolted to the end of a cross pipe spool, which is bolted to the residue extraction auger 361. In one embodiment, the pocket valve 362 is a standard, air-actuated 8-inch or 10-inch ball valve where the ball is sealed on one end. When in the "up" position, the ball forms a bucket. The residue extraction auger 361 can be controlled by the device's control system so that while the pocket valve 362 is in the up position, the residue extraction auger 361 deposits biochar into the pocket valve 362. When the control system stops this process, the residue extraction auger 361 stops and the pocket valve 362 rotates to the "down" position, dumping its contents into an external collection bin or some other secondary removal system. Because the ball on the pocket valve 362 is closed on one end, the pocket valve 362 remains sealed at all times and prevents producer gas from leaking out of the residue extraction assembly 130. A small amount of producer gas does escape, but can be vented safely by a high-point vent pipe or drawn out by vacuum pump.

The device 100 can maintain an appropriate activated carbon level in the filter bed chamber 220 by controlling the rate at which activated carbon is added and the spent carbon is removed from the device 100. In one embodiment, the device 100 has a residue extraction system that monitors the level of carbon in the device using a fill level indicator.

As biochar is consumed, it is replaced by additional biochar. This is accomplished by the feed auger assembly 110, which adds additional biochar to the device 100 and by the residue extraction assembly 130 which removes spent biochar from the device 100. The device 100 may be automated to continuously add biochar to the filter bed chamber 220 based on measurements taken by a fill level sensor 290 that detects when the level of biochar gets low.

In one embodiment, the device can have a water jacket 370. As a result of the water jacket 370 the amount of insulation can vary by a large margin and because of this, the total diameter of the device itself. In one embodiment, the device can have features to protect the operator from hot surface areas and stray microwaves, such as, without limitation, an aluminum safety cage or perforated steel cage, similar to the screen found in the door of a consumer microwave at home. Stray microwaves scatter effectively in water, and a water jacket 370 is also an excellent means of keeping the reactor tubes cool.

IV. Catalytic Chamber(s)

As shown in FIG. 2, in one embodiment, a first catalytic chamber 240 is above the microwave chamber 200. In one embodiment, as shown in FIG. 2, this first catalytic chamber 240 can be cube-shaped and form the top 202 of the microwave chamber 200. As discussed above, this final "zone" or first catalytic chamber 240 can form a ceiling or top 202 to the microwave chamber 200, which can be lined with tiles. The tiles can contain a catalyst impregnated ceramic that converts microwave energy into heat energy. As shown in FIG. 2, the tiles can be arranged vertically, parallel with respect to one another, which forms a permeable barrier and allows gas to pass into the first catalytic chamber 240. In another embodiment, the at least one catalytic reaction chamber is adjacent to the microwave chamber 200.

In one embodiment, an additional reaction chamber is a second catalytic chamber 380. In one embodiment, the second catalytic chamber 380 is adjacent to the microwave chamber 200. As shown in FIG. 1, the second catalytic chamber is contained within a housing 180. As shown in FIG. 3, the second catalytic chamber 380 has an exterior wall 381, an interior wall 385, a proximal end 383 and a distal end 384. The distal end 384 can comprise a first pebble bed 386. The proximal end 383 can comprise a second pebble bed 388. Between the first pebble bed 386 and the second pebble bed 388 is a second wave guide section 389.

These catalytic chambers can contain a variety of catalysts, such as aluminum oxide that are designed to accelerate gas cleaning and biochar reduction. Injection of steam or purified oxygen can also be introduced to increase gas quality as well.

The device 100 further comprises a gas outlet 331. In one embodiment, the gas outlet 331 is on the top of the microwave chamber 200 and in another it is on top of the first catalytic chamber 240. In an embodiment with a second catalytic chamber 380, the second catalytic chamber 380 and the microwave chamber 200 (or, as shown in FIG. 3, the first catalytic chamber 240) can be connected by a flanged pipe 390.

V. Gas Flow

In one embodiment, gas enters at the bottom of the filter bed chamber 220 and passes upward through bed of biochar into the microwave induced plasma in the microwave chamber 200. As the gas travels through the biochar, the biochar absorbs CO, $CO_2$, water and other impurities. Upon exiting the biochar, the gas then passes through the e field and the plasmoid where most, if not all, of the remaining carbon materials, including tars, entrained in the gas are dissociated. While the biochar or lignite is discharging, the gas moves through the microwave chamber 200 by pressure differential, but continues to be irradiated with microwaves. The gas then passes to the heated top 202 of the microwave chamber 200.

The energy level of the electrons in the heated gas molecules is already elevated enough to favor the creation of plasma. A cold gas would require much more energy to produce the same effect.

The plasma field will naturally stay away from the walls of the device. In one embodiment, steam is injected at a point just below the plasma region near the bottom of the "lip" (not shown) that supports the impregnated catalyst disks/tiles. The steam cools the lip and the silica carbide. The hypotheses is that a small enough amount of steam would not affect the plasma state but will in fact liberate some Hydrogen.

In one embodiment, there is a thermocouple on or near the gas outlet 331. There are several different redundant control methods used in the device 100, and most function as a means by which more precise control can be achieved throughout the process. In one embodiment, an effective control method is to monitor the temperature of various parts of the device 100. These temperatures are obtained by way of embedded thermocouples inside of the lined wall of the device 100. In one embodiment, the device's 100 control system uses this information to change the level of microwaves or speed of biochar injection and removal.

One embodiment improves the consistency of the temperature by lining the entire device 100 with silica carbide, silica oxide, aluminum oxide, refractory alloy, other ceramics or another material that is stable at high temperatures. This lining helps to evenly distribute and conduct heat across the device 100 and allows the use of thermocouples while protecting them from the reactions occurring inside the device 100.

The control system may use all of the different methods and combine said methods into an algorithmic controller. The latter does not only allow for redundancy throughout the control system, but also ensures much greater reliability and efficiency. It furthermore ensures that the producer gas is of constant and high quality.

VI. Device Control System

Optimizing the device's 100 operation requires precise real-time adjustments to control the location of the plasmoid. For example, if a mechanical device were inserted in the plasmoid to adjust its location, the high temperatures (between 1600 F and 5000 F) in the microwave chamber 200 would destroy the mechanical device. Therefore, a residue extraction auger is used to control the removal of biochar from the device as it can be placed below the much cooler filter bed of biochar. The changes to the height of the biochar bed, caused by increasing the rate of removal of biochar from the device, induce some of the necessary changes to adjust the vertical location of the plasmoid.

Several methods and systems may be used as part of the overall device control system to induce changes to and to control the plasmoid while the device 100 is operational. The control system uses various algorithms to monitor and adjust the device. The control system may include subsystems capable of real-time adjustments and account for other methods that may only be adjusted while the device is offline.

VII. Sensors and Components

In one embodiment, the control system requires sensors located throughout the device to monitor the device. In one embodiment, the device 100 has a temperature sensor at one or more of the following: (1) biochar outlet 250; (2) gas inlets 350; (3) mid-point of the filter bed chamber 220; (4) the gas outlet 331; and (5) the filter bed chamber inlet 201. In one embodiment, the device 100 has pressure sensors at: gas inlet 330; and gas outlet 331. In one embodiment, the device 100 has a fill level sensor at: a radio-wave proximity switch and a biochar storage tank level switch. In one embodiment, the device 100 has variable frequency drives operating the fee auger assembly 110 and the residue extraction assembly 130. In one embodiment, the device 100 has valving at: the feed auger assembly 110 and the residue extraction assembly 130.

Interpretation:

Embodiments of this invention are described herein. Variations of those embodiments may become apparent to those having ordinary skill in the art upon reading the foregoing description. The inventors expect that skilled artisans will employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

While the disclosure above sets forth the principles of the present invention, with the examples given for illustration only, one should realize that the use of the present invention includes all usual variations, adaptations and/or modifications. within the scope of the claims attached as well as equivalents thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it was individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method of cleaning gas which uses a gas cleaning device, said device comprising:
   a first vertically positioned tube having a perimeter, an interior wall, an exterior wall, a proximal end and a distal end, comprising:
   a filter bed chamber located at the proximal end of the first vertically positioned tube, said filter bed chamber having a top and a bottom, said top of the filter bed chamber having an inlet for carbon-based material and said bottom having a spent carbon outlet and a gas inlet;
   a microwave chamber comprising:
      a gas permeable top comprising a microwave absorbing material, wherein the gas permeable top is a first catalytic chamber,
      a perimeter,
      a bottom connected to the top of the filter bed chamber,
      wave guides located around the perimeter through which microwaves can be introduced into the microwave chamber, and
      a magnetron and an isolator attached to each wave guide;
   a gas outlet located at the distal end of the first vertically positioned tube and connected to the first catalytic chamber; and
   a second catalytic chamber connected to the first catalytic chamber, said second catalytic chamber comprising a second vertically positioned tube having a perimeter, an interior wall, an exterior wall, a proximal end and a distal end;
   said method comprising:
   filling the filter bed chamber up to the top of the filter bed chamber with carbon-based material;
   introducing microwaves into the microwave chamber using the magnetrons and wave guides;
   dissociating long chain hydrocarbons entrained within the gas by passing gas through the gas inlet, the carbon-based material in the filter bed chamber, the microwave chamber, the first catalytic chamber and the second catalytic chamber; and
   siphoning the purified gas.

2. The method of claim 1, further comprising filling the filter bed chamber using a feed auger assembly connected to the filter bed chamber.

3. The method of claim 2, further comprising removing spent carbon using a residue extraction auger assembly attached to the spent carbon outlet.

4. The method of claim 1, further comprising concentrating a microwave field within the device using microwaves supplied by magnetrons.

5. The method of claim 3, further comprising maintaining levels of carbon-based material using the residue extraction auger assembly attached to the spent carbon outlet.

6. The method of claim 2, further comprising refilling and maintaining levels of carbon-based material using the feed auger assembly connected to the filter bed chamber.

7. The method of claim 6, further comprising monitoring and adjusting levels of carbon-based materials using a control system and sensors.

8. The method of claim 1, wherein the microwave absorbing material comprises ceramic tiles impregnated with a material that catalyzes conversion of microwave energy into heat energy.

9. The method of claim 1, said device further comprising a lining on the interior wall wherein the lining is silica carbide and aluminum oxide or carbon and aluminum oxide.

10. The method of claim 1, further comprising injecting steam or purified oxygen into the second catalytic chamber.

11. The method of claim 1, wherein each wave guide of said device is on a different vertical plane.

12. The method of claim 1, said device further comprising a water jacket around the device.

13. The method of claim 1, wherein the carbon-based material is activated carbon.

* * * * *